Figure 1:
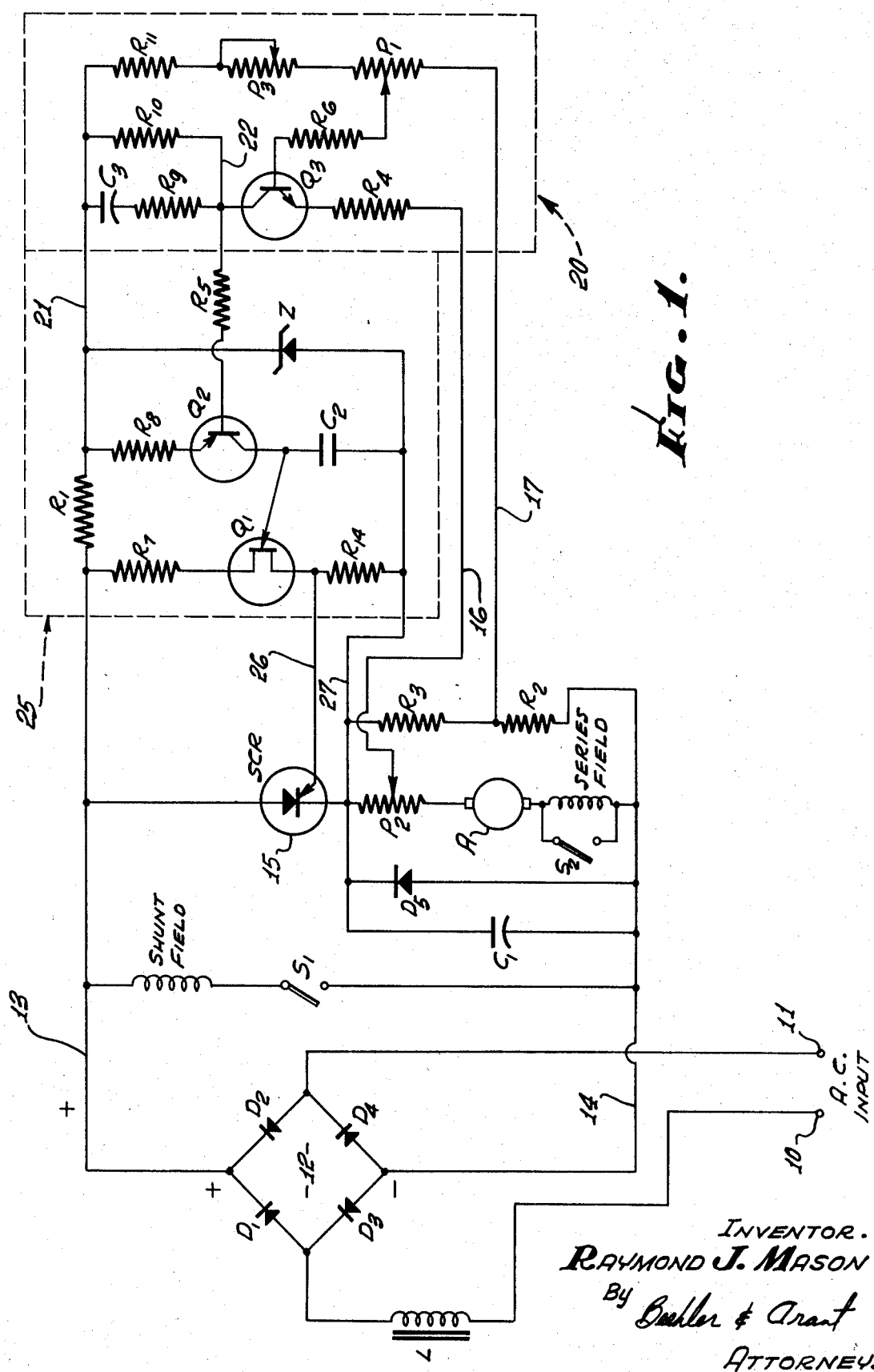

United States Patent

[11] 3,601,673

[72] Inventor Raymond J. Mason
 Lynwood, Calif.
[21] Appl. No. 881,954
[22] Filed Dec. 4, 1969
[45] Patented Aug. 24, 1971
[73] Assignee Minarik Electric Company
 Los Angeles, Calif.

[54] MOTOR CONTROL CIRCUIT
 16 Claims, 2 Drawing Figs.
[52] U.S. Cl. .................................................. 318/308,
 318/317, 318/345, 318/504, 318/507
[51] Int. Cl. ................................................... H02p 5/16
[50] Field of Search .......................................... 318/317,
 345, 346, 504, 505, 507, 308

[56] References Cited
 UNITED STATES PATENTS
 3,373,331 3/1968 Dow .............................. 318/317 X
 3,475,672 10/1969 Oltendorf ...................... 318/317 X Primary Examiner—Oris L. Rader
Assistant Examiner—H. Huberfeld
Attorney—Beehler and Arant ABSTRACT: Alternating current rectified by a bridge rectifier is supplied through an SCR device to a motor armature; the bridge rectifier, SCR device, and armature being connected in a series loop circuit. A firing control circuit associated with the SCR device controls the angle at which the device fires during each half cycle of alternating current received from the bridge rectifier.

A storage capacitor and a freewheeling diode are coupled in parallel with the armature to assist in filtering. A resistor connected in series with the armature produces a feedback voltage signal which is proportional to armature current, and a resistive circuit branch arranged in parallel with the armature provides a feedback voltage signal which is proportional to armature voltage. A signal responsive circuit combines the two voltage feedback signals into a composite control signal for controlling the firing control circuit previously referred to. The firing control circuit is connected between anode and cathode of the SCR device for receiving its operating energy when the SCR device is nonconductive.

INVENTOR.
RAYMOND J. MASON

MOTOR CONTROL CIRCUIT

The purpose of the above abstract is to provide a nonlegal technical statement of the disclosure of the contents of the instant patent application and thus serve as a searching-scanning tool for scientists, engineers and researchers. Accordingly, this abstract is not intended to be used in understanding or otherwise comprehending the principles of the present invention hereinafter described in detail, nor is it intended to be used in interpreting or in any way limiting the scope or fair meaning of the claims appended hereto.

BACKGROUND OF THE INVENTION

The present invention is an improvement over my Pat. No. 3,327,195 entitled "Regulated Power Supply Circuit Utilizing Controlled Rectifier" issued June 20, 1967; and also over my Pat. No. 3,447,055 entitled "DC Motor Speed Control Circuit" issued May 27, 1969.

In controlling the operation of a small DC motor it is desirable to incorporate into a single circuit package the necessary circuitry for rectifying the alternating supply current, for smoothing the rectified current, for selecting the voltage applied to the motor and hence the operating speed of the motor, and for regulating the motor voltage as the supply line voltage and mechanical load on the motor vary. The complete motor controller circuit can be conveniently incorporated in a single package, and in usage it is simply plugged into a standard AC outlet, connected to the DC motor, a speed selection knob is set to a desired speed setting, and a switch is then turned on to energize the motor. Since a particular controller may be manufactured to accommodate several different sizes or styles of motors, there are other settings or adjustments which may be required depending upon the particular motor with which the controller is being used.

Another desirable circuit feature may be used to protect the motor against excessive torque loads. For example, it may be desired to limit the armature current to 200 percent of the rated current. A torque limiting circuit of this kind is shown in my Pat. No. 3,447,055 in FIG. 2 thereof, where transistor $Q_3$ performs the current limiting function.

In order to maintain the speed of the motor constant as the mechanical load on the motor increases, it is necessary to actually increase the voltage applied to the armature. Imperfect filtering of the rectified current is deliberately used because of the high cost of induction coils and capacitors. The control loop that is required for maintaining motor speed constant therefore involves an aspect of positive or regenerative feedback, with its attendant possibilities of hunting or oscillation, as is clearly explained in Pat. No. 3,134,065 issued to William J. Minarik, as well as in my prior Pat. No. 3,447,055.

THE PRESENT INVENTION

One object of the invention is to provide a motor control circuit of the foregoing type, which is so arranged that the need for some of the more expensive components is eliminated.

Another object of the invention is to provide an improved circuit of the foregoing type, which is adapted for use with a relatively large number of different sizes and styles of motors.

A further object of this invention is to provide an improved circuit of the foregoing type which has an improved speed regulation and voltage regulation performance, and is highly reliable in operation.

Still another and independent object of the invention is to provide a novel torque limiting circuit for use in conjunction with a motor control circuit.

DRAWINGS

Figure 2:
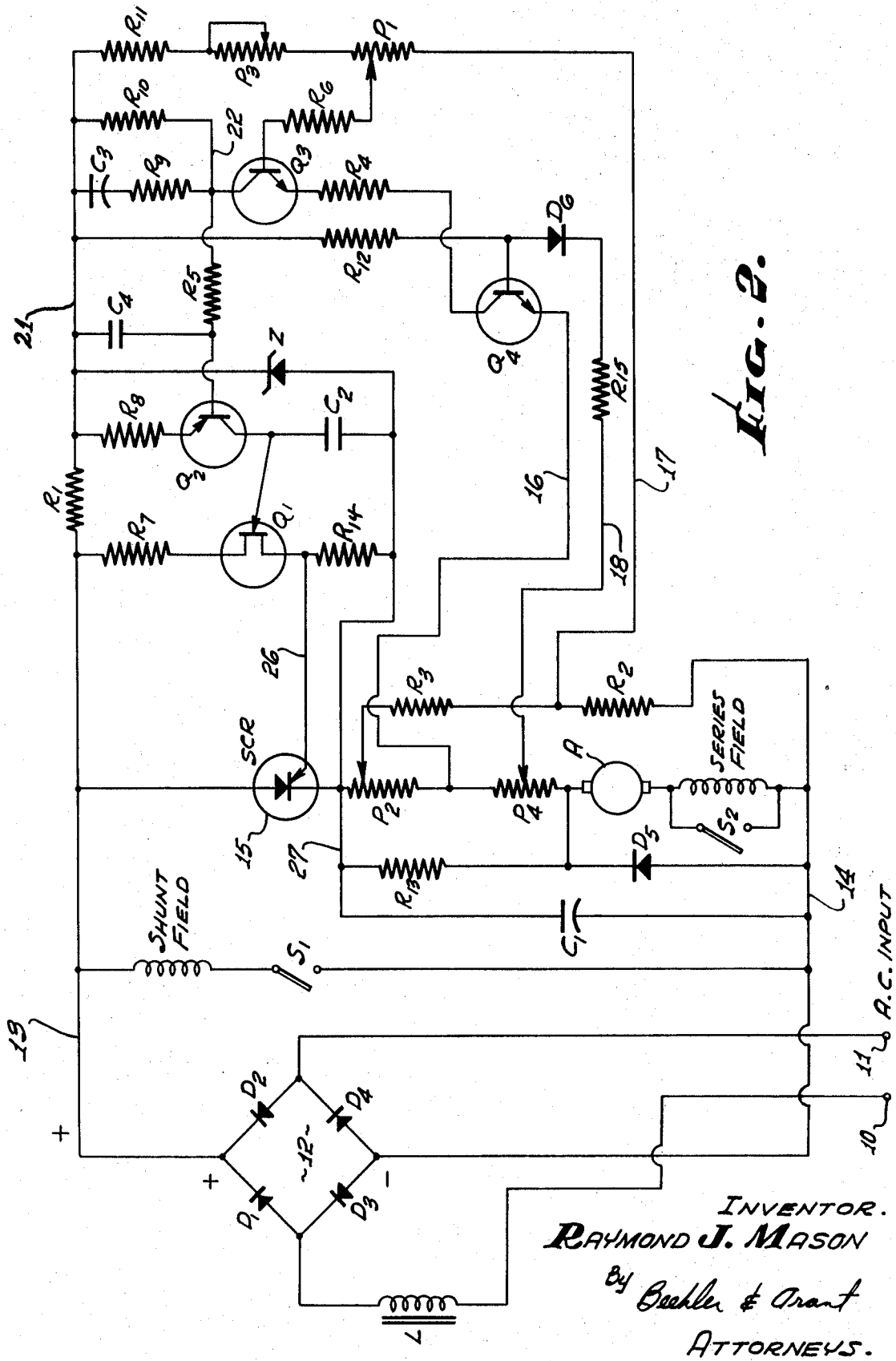

FIG. 1 is a schematic circuit diagram illustrating one embodiment of the invention; and FIG. 2 is a schematic circuit diagram illustrating a second embodiment of the invention.

FIRST EMBODIMENT

Reference is now made to FIG. 1 of the drawings illustrating a first embodiment of the invention. The circuit of FIG. 1 accomplishes the same general purposes as the circuits shown in my Pat. Nos. 3,327,195 and 3,447,055. That is, a single circuit incorporated into a single package is utilized as a power supply circuit for converting alternating current into direct current, for selecting the speed at which the associated motor will operate, for regulating the power supply voltage against supply line voltage fluctuations and also for maintaining the motor speed constant as the load on the motor varies.

The AC input power at the conventional 110 volts is applied to terminals 10, 11, passing directly from terminal 11 to one side of a bridge rectifier 12 and from the terminal 10 through a choke coil L to the other side of rectifier 12. The bridge rectifier 12 includes semiconductor diodes $D_1$, $D_2$, $D_3$, and $D_4$, and a positive DC supply line 13 extends from the positive output terminal of the bridge rectifier while a negative DC supply line 14 extends from the negative terminal. A DC motor armature A and an SCR rectifier device 15 are coupled into a series loop circuit with each other and with the bridge rectifier 12. Bridge rectifier 12 operates continuously while the SCR device operates intermittently in order to control the average voltage applied to the motor armature.

More specifically, the anode of device 15 is connected to positive lead 13 and a potentiometer $P_2$ is connected to its cathode. The other end of $P_2$ is connected to one side of the armature A, and a series field winding is coupled between negative line 14 and the other side of armature A. A switch $S_2$ is connected in parallel with the series field winding so that this particular field winding may be switched into or out of the circuit as desired. A shunt field winding and a switch S1 are connected in series with each other and between the lines 13, 14 so that the shunt field also may be switched in or out as desired. Thus, the same control circuit may be utilized for controlling either a series motor, a shunt motor, or a series-shunt motor. A freewheeling diode $D_5$ has its anode connected to line 14 while its cathode is connected to the cathode of device 15. A storage capacitor $C_1$ is also connected between lead 14 and the cathode of device 15. A resistor $R_3$ has one end connected to the cathode of device 15, and a resistor $R_2$ is connected between the other end of $R_3$ and the line 14; that is, the series combination of $R_2$ and $R_3$ are connected in parallel with the series combination of $P_2$, the motor armature, and the series field. The movable tap on potentiometer $P_2$ is connected to a lead 16 while the juncture of $R_2$ and $R_3$ is connected to a lead 17.

The circuit of the present invention utilizes two separate voltage feedback signals, in a manner generally similar to that disclosed in my Pat. No. 3,447,055. Thus, the output lead 17 produces a first voltage feedback signal which is substantially proportional to the voltage applied across the motor armature. The output lead 16 produces a second voltage feedback signal which is substantially proportional to the current drawn by the motor armature. Both of these voltage signals are measured relative to the cathode of device 15, to which a voltage reference lead 27 is connected.

In place of potentiometer $P_2$ a fixed resistor may be used; however, the movable tap of the potentiometer permits adjustment of the amount of feedback as may be appropriate for a particular motor with which the speed control circuit is being used.

The circuit of FIG. 1 also includes a signal responsive circuit 20, and the leads 16, 17 which serve as output leads for deriving feedback signals from the motor armature also act as input leads for the signal responsive circuit 20. The specific circuit of signal responsive circuit 20 will be described subsequently.

The circuit of FIG. 1 further includes a control means 25 coupled in parallel with the SCR device 15, for selectively initiating current flow therethrough. More specifically, a control lead 26 is connected to the gate terminal of SCR device 15, and the voltage on lead 26 measured relative to the voltage on lead 27 serves as the output signal from the control means 25. Operating energy for the control means 25 is provided by the DC voltage existing between positive supply lead 13 and reference voltage lead 27.

The function of signal responsive circuit 20 is to receive both of the voltage feedback signals and produce a composite control signal, which is delayed with respect time so as to avoid undesired hunting or oscillations, and therefore constitutes a function of a number of cycles of both feedback signals. The composite control signal produced in circuit 20 is supplied on lead 22 to the control means 25. The function of circuit 25 is to respond to that composite control signal and actuate the gate terminal of the SCR device 15 for selectively initiating current flow to the motor armature.

Control circuit 20 includes, more specifically, a positive supply line 21 to which a resistor R11 is connected. A potentiometer $P_3$ is connected to the other end of R11, the movable tap of $P_3$ being connected to the junction between R11 and $P_3$. A potentiometer $P_1$ is connected between the remote end of $P_3$ and lead 17. A resistor $R_{10}$ is also connected to lead 21, the other end of R10 being connected to the collector of an N-P-N transistor $Q_3$. A resistor $R_6$ is connected between the base of $Q_3$ and the movable tap of $P_1$. A resistor $R_4$ is connected between lead 16 and the emitter of $Q_3$. A capacitor $C_3$ has one terminal connected to lead 21, and a resistor $R_9$ is connected between the other terminal of $C_3$ and the collector of $Q_3$. Lead 22 is connected to the collector of $Q_3$ representing the output of circuit 20.

In the operation of circuit 20, the setting of $P_3$ is used as a factory calibration to provide the desired voltage adjustment range for the motor control circuit. $P_1$ is used as the speed selector for the motor. The first voltage feedback signal is supplied to the base of $Q_3$ and the second voltage feedback signal is supplied to the emitter of $Q_3$, hence $Q_3$ in conjunction with its biasing or load circuit operates to produce the composite control signal previously referred to. Capacitor $C_3$ provides the necessary storage or integrating function so that the composite signal appearing on lead 22 at any particular instant of time is a function of a plurality of preceding cycles of both of the feedback signals provided on leads 16 and 17.

In the control circuit 25 a resistor $R_1$ is connected to positive lead 13, a Zener diode Z being connected between the other end of $R_1$ and reference voltage lead 27. Lead 21 is connected to the junction between $R_1$ and diode Z, hence the Zener diode provides a regulated voltage both for the signal responsive circuit 20 and to operate $Q_2$ of control circuit 25.

A resistor $R_8$ is connected between lead 21 and the emitter of a P-N-P transistor $Q_2$. A capacitor $C_2$ is connected between the collector of $Q_2$ and reference lead 27. A resistor $R_5$ is connected between lead 22 and the base of $Q_2$. A resistor $R_7$ is connected between positive lead 13 and the positive base of a unijunction transistor $Q_1$. A resistor $R_{14}$ is connected between reference lead 27 and the negative base of $Q_1$. The control lead of unijunction transistor $Q_1$ is connected to the collector of $Q_2$.

Thus the composite control signal produced by signal responsive circuit 20 on lead 22 is supplied to transistor $Q_2$, and controls the charging of capacitor $C_2$. When the charge on $C_2$ reaches an appropriate level, conduction is initiated in the unijunction transistor $Q_1$, creating a surge of current through $R_{14}$ and thus applying a positive pulse on line 26 to the gate terminal of SCR device 15. Current conduction through device 15 is therefore abruptly initiated.

Each time the SCR device fires the voltage between its anode and cathode drops to a fraction of a volt, and the supply voltage between lines 13 and 27 which is available for control circuit 25 drops accordingly. The control circuit 25, is for practical purposes, shorted out at this time, and remains so until the end of the particular half-cycle. At the same time the operating voltage applied to signal responsive circuit 20 including the transistor $Q_3$ is diminished. This greatly reduced operating voltage for the transistors $Q_1$, $Q_2$, and $Q_3$ while the SCR device is conducting protects the transistors from voltage transients to which they might otherwise be exposed, and therefore protects them against damage.

At the end of the half-cycle of supply voltage the conduction of the SCR device stops, because of the disappearance of its driving voltage. The gate lead of the SCR device is essentially at the same potential as the cathode. When the next half-cycle of supply voltage is applied through the bridge rectifier 12 the SCR device does not initially conduct. However, current flows through resistor $R_1$ and the Zener diode, thus providing a standard operating voltage (typically 20 volts) for transistor $Q_2$. Current also flows through resistor R11 for controlling the bias of transistor of $Q_3$, and through resistor $R_{10}$ for making that transistor viable and responsive to its applied input signals. When the charge on $C_2$ reaches the proper level, under control of $Q_2$ and $Q_3$, the unijunction transistor $Q_1$ breaks down and thus initiates conduction of the SCR device. Then the cycle repeats itself.

SECOND EMBODIMENT

Reference is now made to FIG. 2 of the drawings illustrating a second embodiment of the invention.

The circuit of FIG. 2 is essentially the same as the circuit of FIG. 1, except that a transistor $Q_4$ has been added for the purpose of limiting the current flowing through the armature A, in order to thereby limit the maximum torque applied to the motor. Other circuit changes have also been made which are compatible with the inclusion of transistor $Q_4$. A potentiometer $P_4$ has been incorporated in the circuit in series between the armature A and potentiometer $P_2$. The movable tap of $P_4$ is connected through a lead 18 to a resistor $R_{15}$, the other end of $R_{15}$ being connected to the cathode of a semiconductor diode $D_6$. The anode of $D_6$ is connected to the base of $Q_4$. A bias resistor $R_{12}$ is connected between positive voltage lead 21 and the base of $Q_4$. The upper end of resistor $R_3$ instead of being connected to the cathode of SCR device 15 is connected to the movable tap of potentiometer $P_2$. Lead 16 instead of being connected to the movable tap of $P_2$ is connected to the juncture between $P_2$ and $P_4$. The emitter-collector current path of $Q_4$ is inserted in the lead 16 in series with resistor $R_4$, the collector being connected to $R_4$ while the emitter is connected to lead 16. In addition, a capacitor $C_4$ is connected between positive voltage lead 21 and the base of transistor $Q_2$. A low-resistance resistor $R_{13}$ is connected in parallel with $P_2$ and $P_4$ to carry the main part of the armature current. Diode $D_5$ is shunted across the armature and series field.

In the operation of the circuit of FIG. 2 the voltage signal which controls the torque-limiting transistor $Q_4$ is developed across potentiometer $P_4$ between the leads 16 and 18. Transistor $Q_4$ is normally saturated, but when armature current increases to its predetermined safe value the increased voltage developed across $P_4$ is effective to reverse-bias the emitter of $Q_4$, thus shutting off both $Q_4$ and $Q_3$.

More specifically, the biasing of $Q_4$ is controlled by two generally parallel branches of the circuit. One circuit branch is the potential existing between lead 21 and 18, which is divided by the connection of lead 16 between $P_2$ and $P_4$. Normally the main bias current flows from lead 21 through resistor $R_{12}$ and the base-emitter junction of $Q_4$ to lead 16. The other circuit branch is that existing from lead 21 through resistor $R_{12}$, diode $D_6$, and resistor $R_{15}$ to lead 18. A small current normally flows through this branch of the circuit, and resistors $R_{12}$ and $R_{15}$ provide a voltage division ratio, with the resulting voltage at the base of $Q_4$ being consistent with forward biasing of the base-emitter junction. When armature current increases beyond the normal value the voltage across $P_2$ increases and the voltage across $P_4$ increases, both in proportion to the armature current. There is an increased voltage between lead 16 and lead 21, and there is also an increased voltage between lead 18 and lead 16, but the ratio of these voltages has changed. The voltage divider operation of $R_{12}$ and $R_{15}$ causes the potential applied to the base of $Q_4$ to drop so that the base-emitter junction is back-biased.

The circuit action is sharpened and accentuated by the nonlinear action of diode $D_6$. Under normal load conditions when normal armature current is flowing the diode permits only a very small current to flow through $R_{15}$. But with increased armature current and increased voltage appearing across $P_4$ the driving voltage for diode $D_6$ is increased to more than 0.6 volt, with the result that a far greater current flows through the $R_{15}$ branch of the circuit. This increased current flow produces a sharp drop in potential on the base of $Q_4$, thus producing a sharply cutoff reverse-biasing action.

In the torque limiting circuit of FIG. 2 the movable tap of $P_4$ may be adjusted for the particular level of maximum armature circuit that is desired. The maximum current may, of course, vary depending upon the particular size and style of motor with which the control circuit is being used.

In the circuit of FIG. 2 typical components are:

$Q_4$   2N2923
$D_6$   1 amp. 600 v. silicon diode
$R_{12}$ 10 560 K ohms, 1/2 w.
$R_{15}$ 18 K ohms, 1/2 w.
$P_4$   50 ohms, 1-1/2 w. pot.
$R_{13}$ 1 ohm, 10 w. (for 1/8 H.P. motor)

The torque control circuit of FIG. 2 has a much sharper cutoff than the type of torque control circuit which is shown in FIG. 2 of my Pat. No. 3,447,055, and works a great deal better.

What I claim is:

1. A motor speed control circuit comprising:
   an SCR device coupled in a series loop circuit with a motor armature for controlling the energy flow thereto;
   means for applying a rectified but pulsating voltage across said series loop circuit;
   means for producing a first voltage feedback signal substantially proportional to the voltage applied to the motor armature;
   means for producing a second voltage feedback signal substantially proportional to the current drawn by the motor armature;
   signal responsive means responsive to both of said feedback signals for producing a composite control signal as a function of a plurality of cycles of both of said feedback signals;
   and control means coupled in parallel with said SCR device and energized by the voltage existing between anode and cathode thereof, said control means having an input coupled to said signal responsive means for receiving said composite control signal and having an output coupled to the gate terminal of said SCR device for selectively initiating current flow through said SCR device, whereby each time that said SCR device commences to conduct the voltage between its anode and cathode drops to about a fraction of a volt and the energizing voltage for said control means drops accordingly.

2. A motor speed control circuit as claimed in claim 1 wherein said second voltage feedback signal producing means includes a resistor coupled in series with the motor armature, and which further includes a capacitor coupled in parallel with the series combination of said armature and resistor.

3. A motor speed control circuit as claimed in claim 2 which further includes a diode coupled in parallel with said capacitor and poled oppositely to said SCR device.

4. A motor speed control circuit as claimed in claim 2 wherein said signal responsive means includes an electron discharge device having first and second control electrodes coupled to said first and second voltage feedback signal producing means, respectively, and having an output electrode, and further including a storage capacitor coupled to said output electrode.

5. A motor speed control circuit as claimed in claim 2 wherein said first voltage feedback signal producing means includes an additional pair of resistors coupled in series with each other and in parallel across said series combination of armature and resistor.

6. A motor speed control circuit as claimed in claim 4 wherein said signal responsive means includes an electron discharge device having first and second control electrodes coupled to said first and second voltage feedback signal producing means, respectively, and having an output electrode, and further including a storage capacitor coupled to said output electrode.

7. A motor speed control circuit as claimed in claim 1 wherein said signal responsive means includes an electron discharge device having first and second control electrode coupled to said first and second voltage feedback signal producing means, respectively, and having an output electrode, and further including a storage capacitor coupled to said output electrode.

8. A motor speed control circuit as claimed in claim 7 wherein said control means includes a unijunction transistor, a firing capacitor, a transistor regulating current flow to said firing capacitor, and a Zener diode regulating the voltage supplied to the series combination of said firing capacitor and transistor.

9. A motor speed control circuit as claimed in claim 1 wherein said control means includes a unijunction transistor, a firing capacitor, a transistor regulating current flow to said firing capacitor, and a Zener diode regulating the voltage supplied to the series combination of said firing capacitor and transistor.

10. A motor speed control circuit comprising:
    a rectifier, an SCR device, and a storage capacitor coupled together in a series loop circuit;
    an alternating current source coupled to said rectifier;
    means for coupling the motor armature in parallel with said storage capacitor;
    means coupled in parallel with said storage capacitor for developing feedback signals from the motor armature;
    and a firing control circuit for controlling the firing angle of said SCR device during each half-cycle of voltage applied through said rectifier, said firing control circuit being connected between anode and cathode of said SCR device for receiving operating energy when said SCR device is nonconductive, having an input not directly connected to said SCR device but coupled to said feedback developing means for receiving said feedback signals therefrom, and having an output connected to the gate lead of said SCR device for selectively initiating conduction of said device.

11. A motor speed control circuit as claimed in claim 10 wherein said feedback developing means includes a resistor coupled in series with the motor armature, the series combination of said resistor and motor armature being coupled in parallel with said storage capacitor; and means for deriving across said resistor a voltage signal proportional to armature current.

12. A motor speed control circuit as claimed in claim 11 which includes a voltage divider coupled in parallel with said storage capacitor, and means for deriving from said voltage divider a voltage signal proportional to armature voltage.

13. A motor speed control circuit as claimed in claim 12 wherein said firing control circuit includes a transistor having two input electrodes to which said two voltage signals are respectively coupled, and an output electrode to which is coupled a load circuit including a capacitor and resistor connected in parallel.

14. A motor speed control circuit as claimed in claim 10 which includes a voltage divider coupled in parallel with said storage capacitor, and means for deriving from said voltage divider a voltage signal proportional to armature voltage.

15. A motor speed control circuit having provision for limiting the armature current to a predetermined safe value, comprising:
    a rectifier, an SCR device, and a motor armature coupled together in a series loop circuit;
    an alternating current source coupled to said rectifier;

a firing circuit for controlling the firing of said SCR device during each half cycle of the alternating voltage that passes through said rectifier;

means associated with said armature for developing regenerative feedback control signals;

a control circuit responsive to said control signals when the armature load increases to actuate said firing circuit so as to increase the armature voltage, said control circuit including a first transistor having a bias current path, a second transistor having its emitter-collector current path connected as a series portion of said bias current path, means normally biasing said second transistor to a conductive state so that said first transistor is normally conductive and circuit means for normally delivering actuating current through the emitter-collector path of said first transistor to said firing circuit;

and circuit means responsive to the armature current, as said predetermined safe value is approached, for interrupting said normal biasing means to thereby open the bias current path of said first transistor.

16. A motor speed control circuit as claimed in claim 15 which includes a voltage divider having a midpoint connected to the base of said second transistor, a resistor connected in series with the armature in said series loop circuit so as to produce a control voltage proportional to armature current, said voltage divider having one of its ends connected to one end of said resistor, the base-emitter path of said second transistor being connected to the other end of said resistor.